United States Patent
Zhang et al.

(10) Patent No.: US 9,174,424 B2
(45) Date of Patent: Nov. 3, 2015

(54) POSITIONING MECHANISM AND BONDING DEVICE USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zhao-Qian Zhang, Shenzhen (CN); Wen-Cai Zhou, Shenzhen (CN); Xue-Hua Lei, Shenzhen (CN); Peng-Hui Chen, Shenzhen (CN); Ying-Jun Peng, Shenzhen (CN); Wen-Jie Lang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 310 days.

(21) Appl. No.: 13/917,653

(22) Filed: Jun. 14, 2013

(65) Prior Publication Data
US 2014/0053985 A1    Feb. 27, 2014

(30) Foreign Application Priority Data
Aug. 24, 2012  (CN) .......................... 2012 1 03037969

(51) Int. Cl.
*B32B 37/00*  (2006.01)
*B32B 38/18*  (2006.01)
*B23Q 1/64*   (2006.01)

(52) U.S. Cl.
CPC . *B32B 38/18* (2013.01); *B23Q 1/64* (2013.01); *B32B 38/1833* (2013.01); *B32B 2315/08* (2013.01); *Y10T 156/17* (2015.01)

(58) Field of Classification Search
CPC  B32B 38/18; B32B 38/1825; B32B 38/1833; B23Q 1/64
USPC ............... 156/538, 539, 556, 580, 581, 583.1
See application file for complete search history.

(56) References Cited

U.S. PATENT DOCUMENTS

| 5,397,423 | A  | * | 3/1995 | Bantz et al. | ................... 156/362 |
| 2002/0026988 | A1 | * | 3/2002 | Jung | .......................... 156/583.1 |
| 2010/0224310 | A1 | * | 9/2010 | Jones | ............................. 156/199 |

FOREIGN PATENT DOCUMENTS

| CN | 102009361 A | 4/2011 |
| TW | M373819 U1 | 2/2010 |
| TW | M428872 U1 | 5/2012 |

*Primary Examiner* — James Sells
(74) *Attorney, Agent, or Firm* — Novak Druce Connolly Bove + Quigg LLP (57) ABSTRACT

A positioning mechanism includes a loading assembly and a clamping assembly. The clamping assembly includes a driver mounted on the bottom of the loading assembly, at least two sliding members driven by the driver, and at least two clamping subassemblies mounted on the top of the loading assembly. The clamping subassemblies are divided into two groups and are arranged and mounted adjacent to opposite sides of the loading assembly, and the sliding members are connected to the two groups of the at least two clamping subassemblies, respectively. The driver is capable of driving the sliding members to move away from or toward each other to enable the two groups of the clamping subassemblies to move toward or away from the loading assembly to clamp or release a workpiece on the loading assembly. The present invention further discloses a bonding device using the positioning mechanism.

20 Claims, 7 Drawing Sheets

POSITIONING MECHANISM AND BONDING DEVICE USING THE SAME

BACKGROUND

1. Technical Field

The present disclosure relates to a positioning mechanism, more particularly, to a positioning mechanism configured with a clamping assembly, and a bonding device using the same.

2. Description of Related Art

A bonding device with a positioning mechanism is used in product manufacturing to bond a first workpiece to a second workpiece. The positioning mechanism includes a loading member and a positioning member. The loading member defines a positioning groove in the top surface of the second workpiece and a positioning cutout in the bottom of the positioning groove. The positioning groove is defined to receive the first workpiece. The positioning cutout allows the second workpiece to pass through. When bonding, the positioning member rests against the first workpiece in the positioning groove of the loading member. The second workpiece is driven to rest against the first workpiece through the positioning cutout of the loading member. However, the bottom surface of the positioning member entirely rests against the first workpiece, so when thicknesses of the first workpiece are uneven due to fabrication tolerances and errors, the first workpiece becomes tilted, thereby negatively impacting bonding quality of the workpieces.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
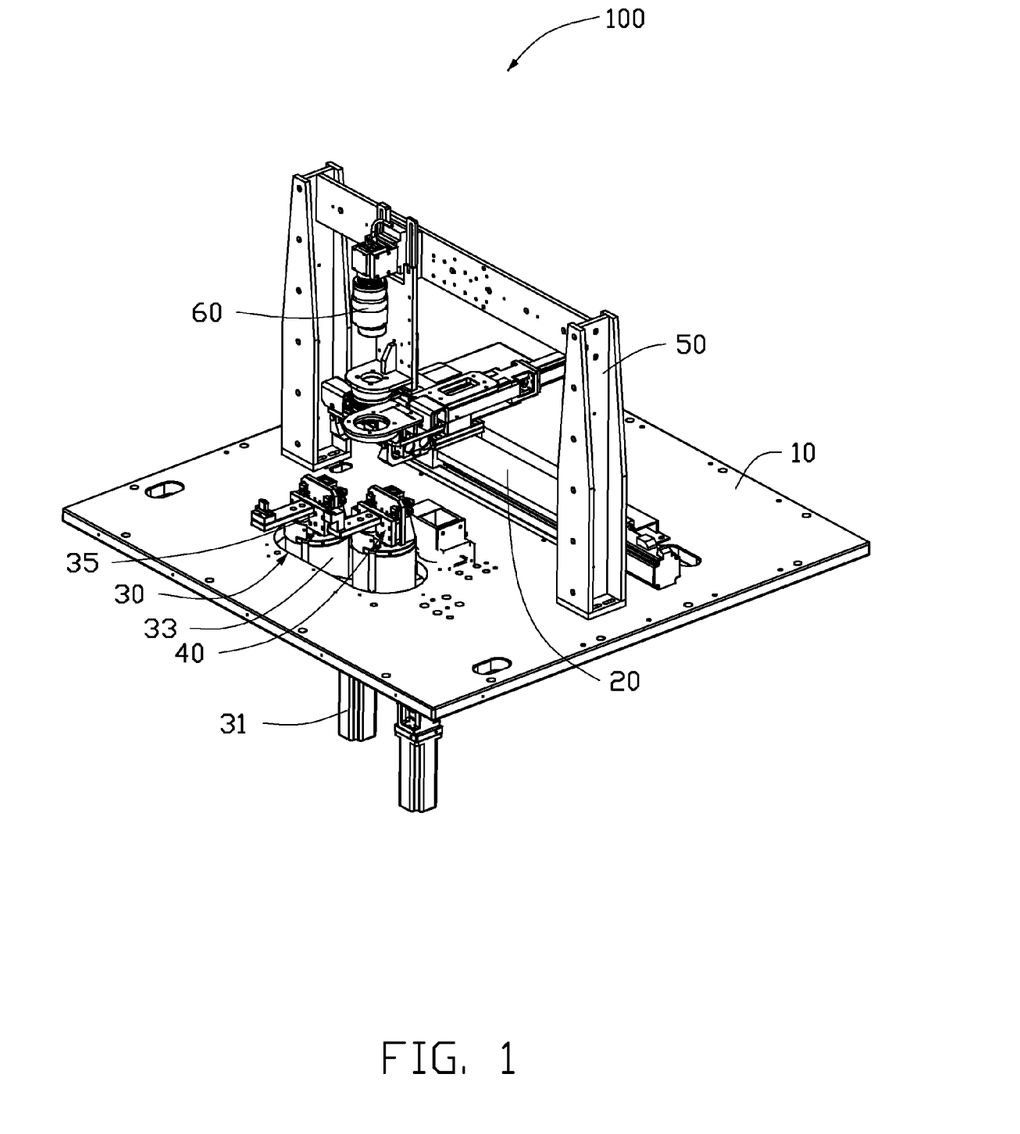
FIG. 1 is an isometric view of an embodiment of a bonding device, including a positioning mechanism.
Figure 2:
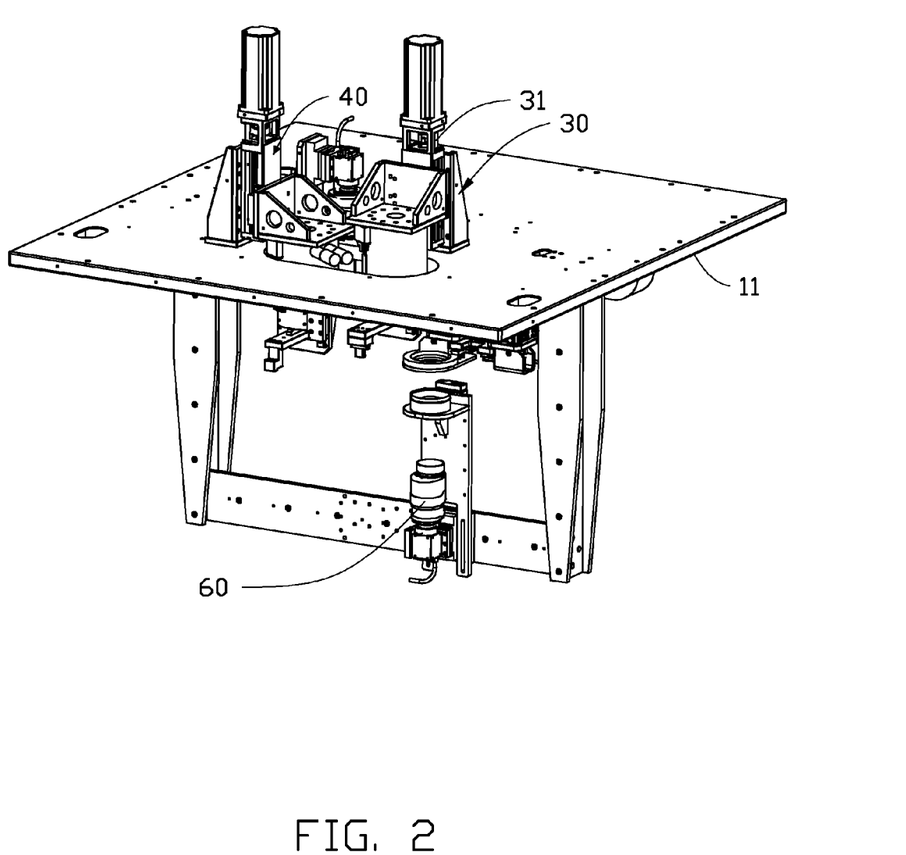
FIG. 2 is similar to FIG. 1, but viewed from another aspect.

FIGS. 1 and 2 show an embodiment of a bonding device 100 including a platform 10, a positioning mechanism 20, a first bonding mechanism 30, a second bonding mechanism 40, a bracket 50, a first detection module 60, and a second detection module (not shown). The positioning mechanism 20, the first bonding mechanism 30, the second bonding mechanism 40, the bracket 50, and the second detection module are mounted on the platform 10. The first detection module 60 is mounted on the bracket 50. The positioning mechanism 20 is employed to move and position a first workpiece (not shown). The first bonding mechanism 30 is employed to move and align a second workpiece (not shown) to the first workpiece. The second bonding mechanism 40 is employed to move and align a third workpiece (not shown) to the second workpiece. The first detection module 60 is employed and configured to detect a positioning deviation between the second workpiece and the first workpiece. The second detection module is employed and configured to detect a positioning deviation between the third workpiece and the second workpiece. In one embodiment, the first workpiece is a glass sheet, the second workpiece is a gauze element, and the third workpiece is a silica gel film.

Figure 3:
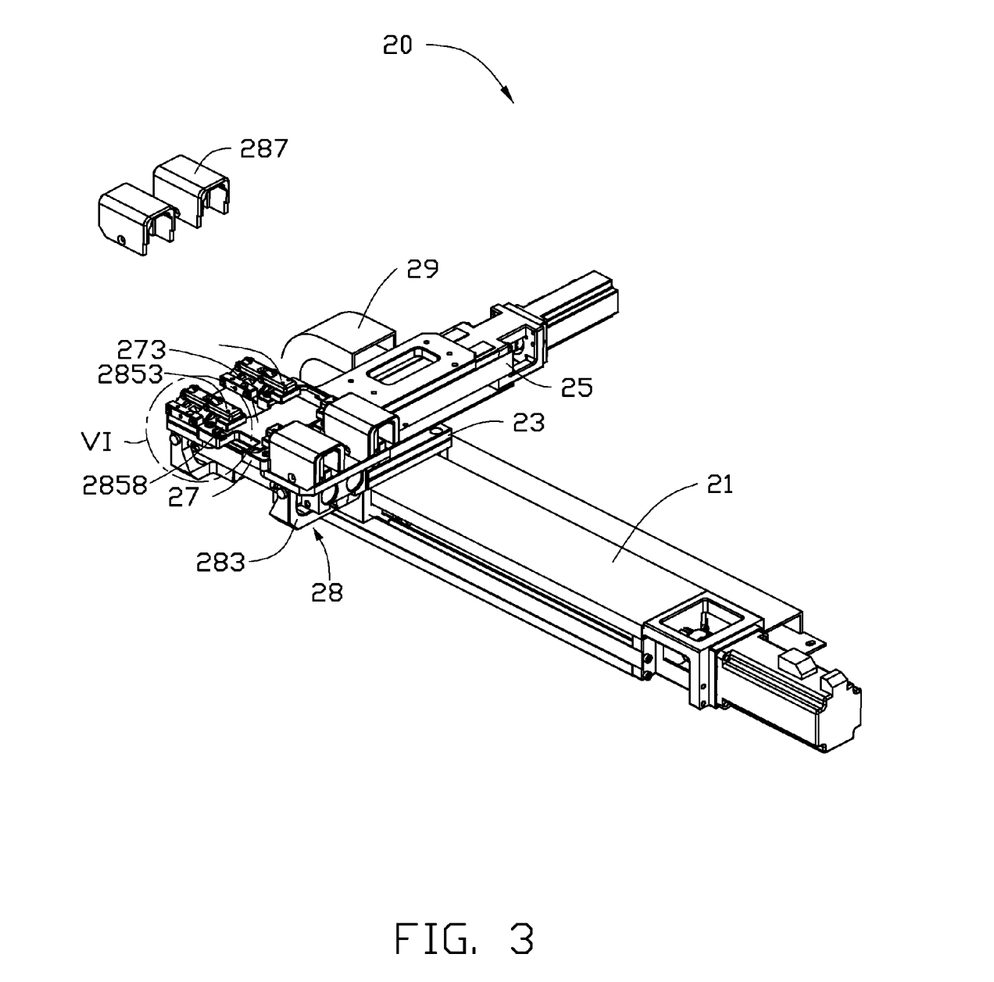
FIG. 3 is a partial, isometric view of the positioning mechanism of FIG. 1.
Figure 4:
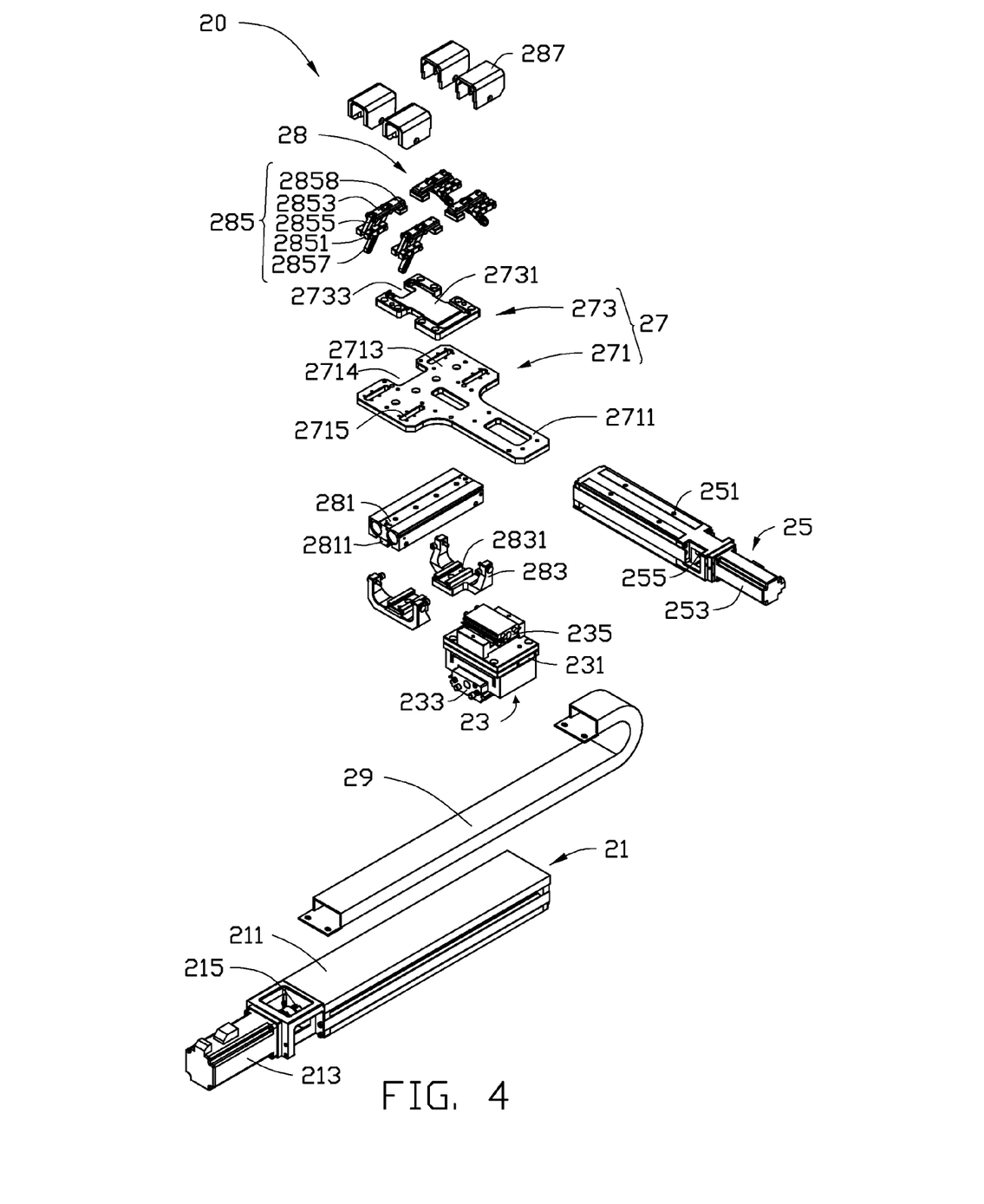
FIG. 4 is a partial, exploded, isometric view of the positioning mechanism of FIG. 3.
Figure 5:
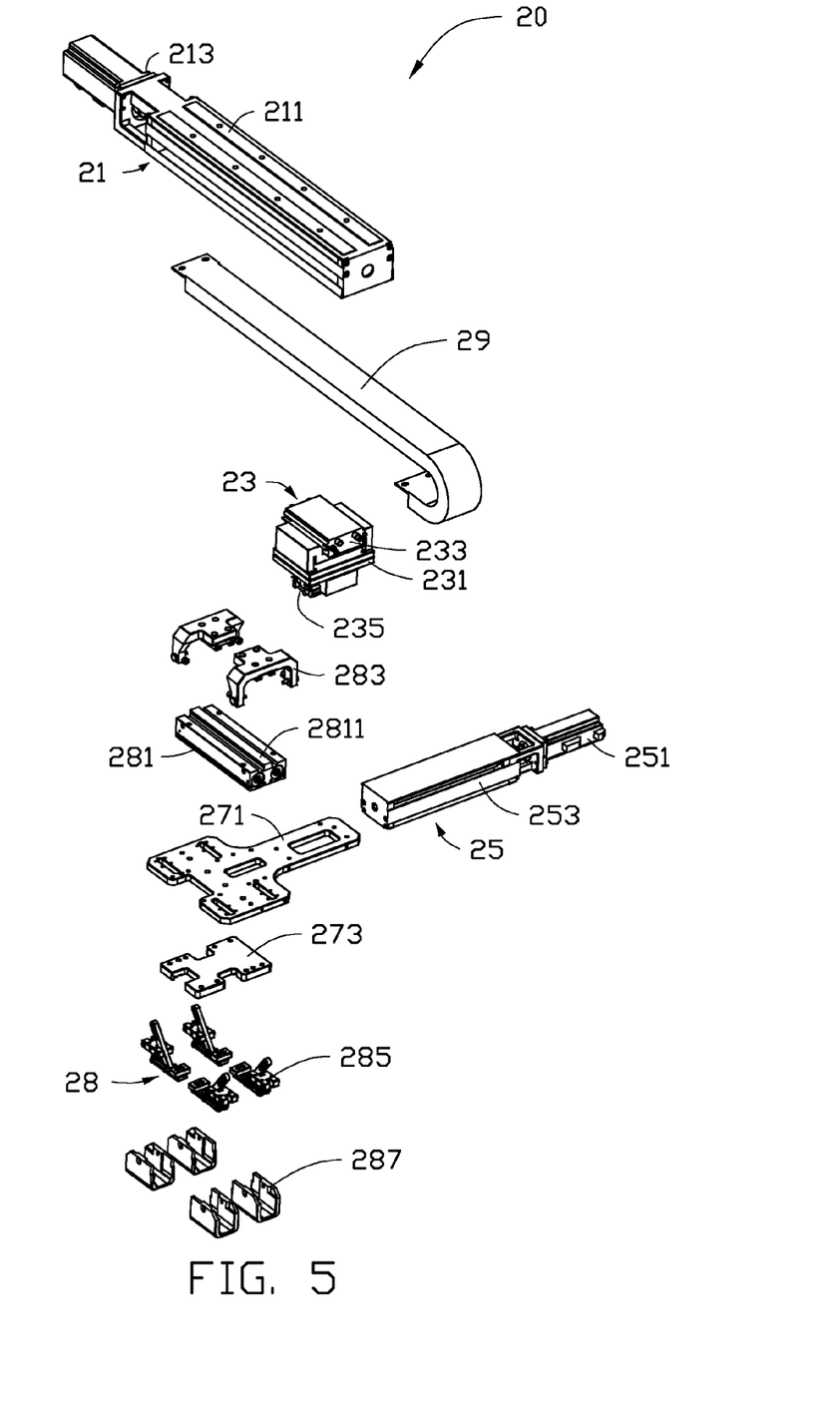
FIG. 5 is similar to FIG. 4, but viewed from another aspect.

Also referring to FIGS. 3 through 5, the positioning mechanism 20 is located on the platform 10, and includes a first driving assembly 21, a transmission member 23, a second driving assembly 25, a loading assembly 27, a clamping assembly 28, and a receiving barrel 29. The first driving assembly 21 includes a first shell 211, a first driving member 213 at an end of the first shell 211, and a first screw leading rod 215 received in the first shell 211. The first screw leading rod 215 is connected to and driven by the first driving member 213. The transmission member 23 includes a base seat 231 with a first screw portion 233 and a second screw portion 235 on opposite sides of the base seat 231. The base seat 231 is movably mounted on the first shell 211. The first screw portion 233 engages with the first screw leading rod 215, and slides along a longitudinal direction (a first direction) of the first shell 211. The second driving assembly 25 is capable of sliding along a second direction perpendicular to the first direction. The second driving assembly 25 includes a second shell 251, a second driving member 253 at an end of the second shell 251, and a second screw leading rod 255 received in the second shell 251. The second shell 251 is slidably mounted on the transmission member 23, and perpendicular to the first shell 231. The second driving member 253 is connected to and drives the second screw leading rod 255. The second screw leading rod 255 engages with the second screw portion 235 of the transmission member 23.

The loading assembly 27 is fixedly mounted on the end of the second shell 251 away from the end thereof next to the first driving member 253. The loading assembly 27 includes a loading member 271 and a positioning member 273 superposed on the loading member 271. The loading member 271 includes a fixing portion 2711 and a loading portion 2713 connected to the fixing portion 2711. The fixing portion 2711 is fixedly mounted on the second shell 251, and the loading portion 2713 protrudes out from an end of the second shell 251. The loading portion 2713 defines a cutout 2714 in the end opposite away from the fixing portion 2711. The loading portion 2713 is wider than the positioning member 273. The loading portion 2713 further defines a plurality of extending grooves 2715 in opposite sides of the loading portion 2713 and adjacent to the positioning member 273. The positioning member 273 is fixedly laminated on the loading portion 2713 of the loading member 271. The positioning member 273 defines a positioning groove 2731 for receiving the first workpiece and a positioning cutout 2733 at an edge of a bottom of the positioning groove 2731 corresponding to the cutout 2714 of the loading member 271. The cutout 2714 of the loading member 271 and the positioning cutout 2733 of the positioning member 273 cooperatively allow the second workpiece to pass through the cutout 2714, and the positioning cutout 2733, respectively.

The clamping assembly 28 includes a driver 281, a pair of sliding members 283, four clamping subassemblies 285, and four covers 287. The driver 281 is mounted on the bottom of the loading portion 2713 of the loading member 271, and includes a guiding portion 2811 on the bottom thereof. The pair of sliding members 283 is slidably mounted on the guiding portion 2811, and is driven by the driver 281 to move away from or towards each other. Each sliding member 283 is substantially C shaped, and includes a sliding portion 2831 located at the bottom thereof (the C shaped sliding member 283). The sliding portion 2831 slidably engages with the guiding portion 2811 of the driver 281. The four clamping subassemblies 285 are paired up and divided into two groups mounted on opposite sides of the loading portion 2713 of the loading member 271. The pair of sliding members 283 is connected to the two groups of clamping subassemblies 285, respectively.

Figure 6:
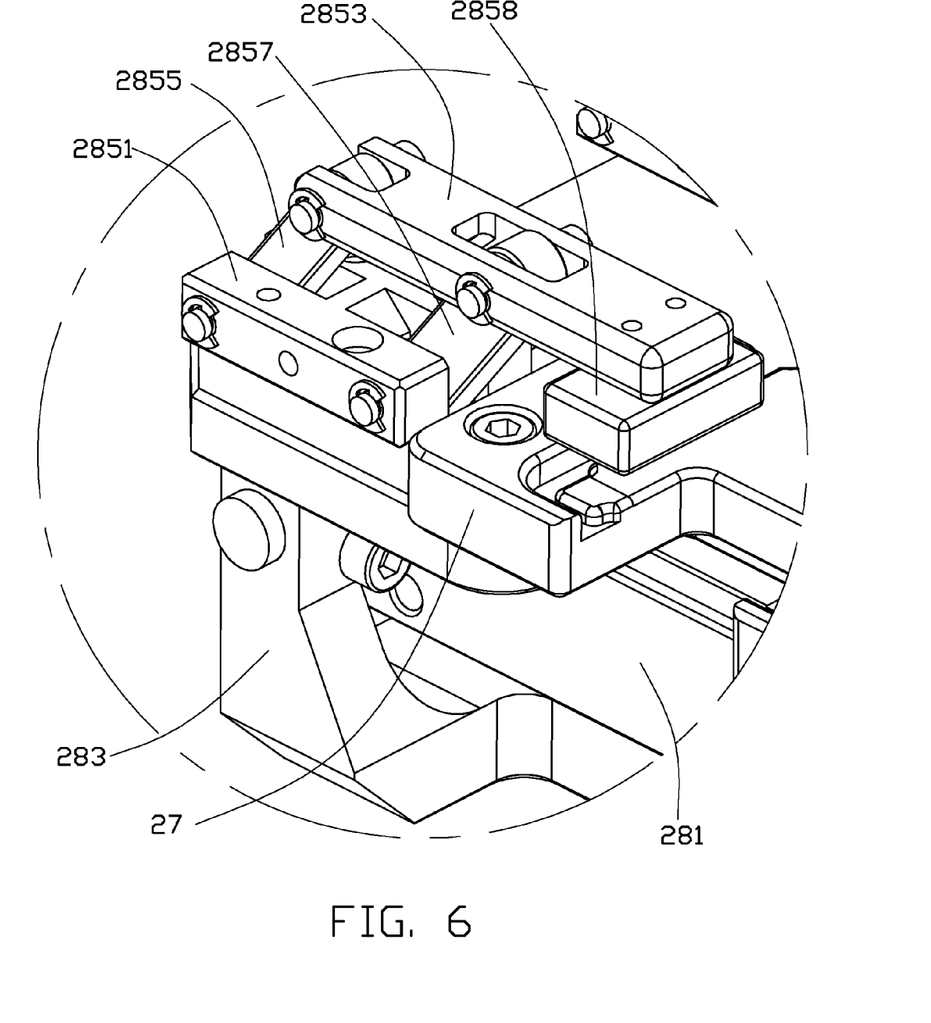
FIG. 6 is an enlarged view of circled portion VI of FIG. 3.
Figure 7:
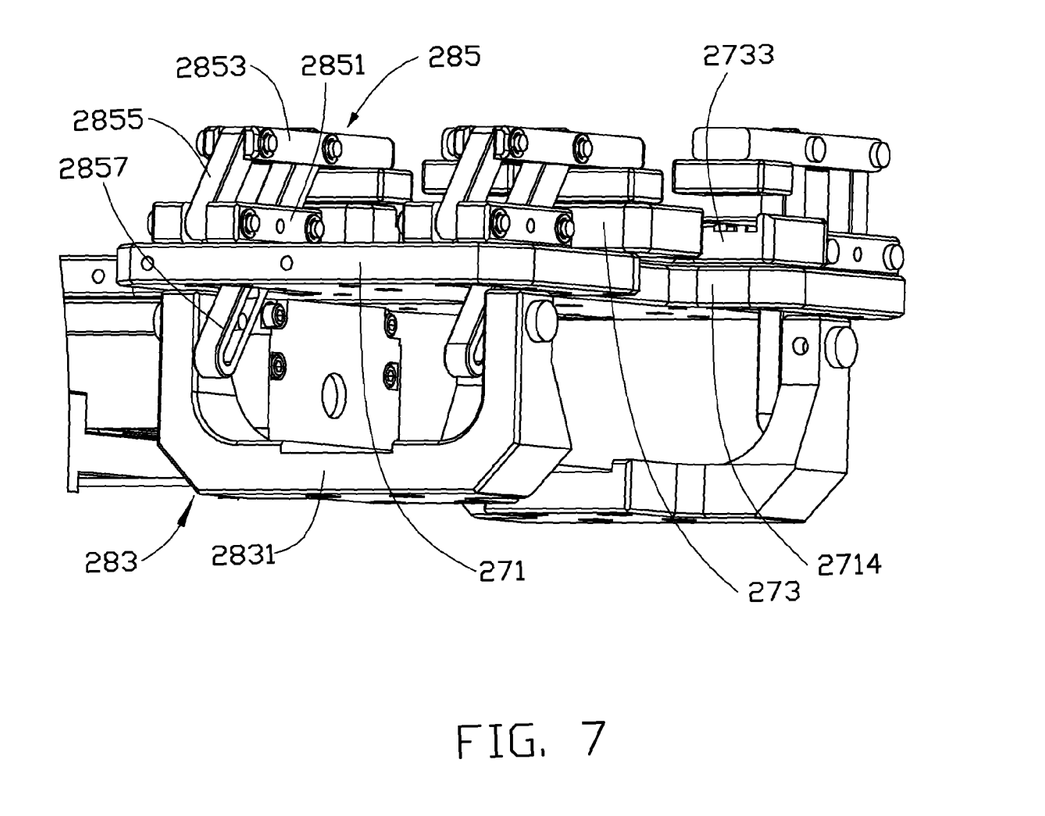
FIG. 7 is an enlarged, partial, isometric view of the positioning mechanism of FIG. 3.

Also referring to FIG. 6 through 7, a pair of clamping subassemblies 285 belonging to the same group is arranged parallel to each other and connected to two ends of the C shaped structure of the sliding member 283. Each clamping subassembly 285 includes a base rod 2851 mounted on the loading member 271, a clamping rod 2853 parallel to the base rod 2851, a linking rod 2855, a pressing rod 2857, and a clamping block 2858. The clamping rod 2853 protrudes toward the positioning groove 2731 of the positioning member 273, and forms a resisting end 2859 located above the positioning groove 2731. The clamping block 2858 is mounted on the resisting end 2859 of the clamping rod 2853. The linking rod 2855 rotatably interconnects the ends of the base rod 2851 and the clamping rod 2853 away from the positioning member 273. The pressing rod 2857 is arranged parallel to and spaced away from the linking rod 2855.

A first end of the pressing rod 2857 is connected to a middle portion of the clamping rod 2853, and a second end of the pressing rod 2857 extends through the extending groove 2715 of the loading member 271 and is connected to the end of the sliding member 283 which is C-shaped. The middle portion of the pressing rod 2857 is rotatably connected to the end of the base rod 2851 away from the linking rod 2855. The four covers 287 cover the four clamping subassemblies 285 and are fixed to the loading member 271. The four clamping subassemblies 285 may be divided up in other ways or arrangements, such as configuring in one-three, and so on. In other embodiment, the pressing rod 2857 may be connected to the ends of the clamping rod 2853 and the base rod 2851 away from the positioning member 273, while the linking rod 2855 may be connected to the end of the base rod 2851 located near the positioning member 273 and the middle portion of the clamping rod 2853.

The receiving barrel 29 is made of flexible materials, and defined in a hollow pipe shape. The receiving barrel 29 is arranged parallel to the first shell 211 of the first driving assembly 21, and defines a receiving passage 291 (see FIG. 4) along a longitudinal direction thereof. An end of the receiving barrel 29 is fixed to the platform 10 adjacent to the first driving member 213, and the opposite end of the receiving barrel 29 is fixed to the second shell 251 of the second driving assembly 25. The receiving barrel 29 is used to receive cables (not shown) of the second driving assembly 25.

Referring to FIGS. 1 through 3 again, the first bonding mechanism 30 is mounted on the platform 10, and includes a linear servo module 31, a rotation module 33, and a supporting module 35. The linear servo module 31 is mounted on the bottom of the platform 10, the rotation module 33 is mounted on the linear servo module 31 and extends out of the platform 10, and the supporting module 35 is mounted on the rotation module 33 and located above the platform 10. The linear servo module 31 is capable of adjusting the height of the rotation module 33 relative to the platform 10. The rotation module 33 is capable of rotating the supporting module 35 to adjust the angle of the second workpiece. The supporting module 35 includes a heating member (not shown) to heat the second workpiece when bonding.

The second bonding mechanism 40 is mounted on the platform 10 adjacent to the first bonding mechanism 30. The second bonding mechanism 40 is similar to the first bonding mechanism 30, except that the heating member is substituted by a suction member (not shown) for fetching the third workpiece.

The bracket 50 is mounted on the platform 10 adjacent to the positioning mechanism 20. The first detection module 60 is mounted on the bracket 50 and located above the loading assembly 27 of the positioning mechanism 20. The second detection module is similar to the first detection module 60, and is mounted on the platform 10 adjacent to the second bonding mechanism 40. In the embodiment, both the first detection module 60 and the second detection module are charge-coupled device (CCD) detection modules.

In assembly, the first driving assembly 21 is mounted on the platform 10. The transmission member 23 is slidably mounted on the first shell 21, and engages with the first screw leading rod 215. The second driving assembly 25 is superposed on the first driving assembly 21, and the second shell 251 is arranged perpendicular to the first shell 211. The second screw leading rod 255 engages with the transmission member 23. The loading assembly 27 is mounted on an end of the second shell 251. The clamping assembly 28 is assembled onto the loading assembly 27. Opposite ends of the receiving barrel 29 are connected to the platform 10 and the second shell 251, respectively. The first bonding mechanism 30 is assembled to the platform 10, and the second bonding mechanism 40 is assembled to the platform 10 adjacent to the first bonding mechanism 30. The bracket 50 is fixed to the platform 10; and the first detection module 60 is mounted on the bracket 50 and located above the positioning mechanism 20. The second detection module is mounted on the platform 10 adjacent to the second bonding mechanism 40.

In use, the first workpiece is located in the positioning groove 2731 of the positioning member 273. The driver 281 drives the pair of sliding members 283 to slide away from each other such that the pair of sliding members 283 drives the pressing rods 2857 and the linking rods 2855 to rotate. Then, the clamping rods 2853 of the two groups of the clamping subassemblies 285 move toward each other and downward until the clamping blocks 2858 press against the periphery of the first workpiece. The first driving assembly 21 and the second driving assembly 25 move the first workpiece toward the first detection module 60. The second workpiece is positioned on the first bonding mechanism 30, and moved by the first bonding mechanism 30 until the second workpiece is located below the first workpiece.

The first detection module 60 and the rotation module 33 cooperatively adjust the rotation angle of the second workpiece relative to the first workpiece. The linear servo module 31 drives the second workpiece to extend through the cutout 2714 and the positioning cutout 2733 and to bond to the first workpiece. The third workpiece is positioned on the second bonding mechanism 40, and the positioning mechanism 20 drives the first workpiece toward the third workpiece until the first workpiece is aligned with the third workpiece. Then, the rotation angle of the third workpiece relative to the first workpiece is adjusted by the second detection module and the second bonding mechanism 40. Finally, the second bonding mechanism 40 bonds the third workpiece to the first workpiece.

Since each clamping subassembly 285 is basically four bars pivotally linked and the two groups of clamping subassemblies 285 are driven by the pair of sliding members 283, the amount of forces exerted on the first workpiece by the two groups of clamping subassemblies 285 can be adjusted adaptively due to the deforming of the four-bar shape thereof, so an inclining of the first workpiece can be thereby prevented. Due to the leverage of the pressing rod 2857, the amount of forces exerted on the first workpiece can thereby clamp the first workpiece more stably. The receiving barrel 29 can protect the cables of the second driving assembly 25 from being damaged. The present configuration of detection modules in the embodiment, including the first detection module 60 and the second detection module, increases the bonding precision of the bonding device 100 and thereby reduces the overall product manufacturing production time. Furthermore, the cost of the bonding process of multiple workpieces is reduced.

When the third workpiece is not required, the second bonding mechanism 40 and the second detection module can be omitted. When the first workpiece is aligned with the first detection module 60 at the very start of the bonding process, the first driving assembly 21, the transmission member 23, and the second driving assembly 25 can be omitted, and the loading assembly 27 can be directly mounted on the platform 10. In certain applications when wires do not need to be covered, the receiving barrel 29 may be omitted.

The driver 281 may include a plurality of guiding portions 2811 parallel to each other. The two sliding members 283 slidably engage with each of the guiding portions 2811. The sliding members 283 may be connected to one clamping subassembly 285 only. The first driving assembly 21 may be a cylinder or a driving rod to drive the transmission member 23 to move.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A positioning mechanism, comprising
   a loading assembly; and
   a clamping assembly, comprising:
      a driver mounted on a bottom of the loading assembly;
      at least two sliding members driven by the driver; and
      at least two clamping subassemblies mounted on a top of the loading assembly, wherein the at least two clamping subassemblies are divided into two groups, the two groups of the at least two clamping subassemblies are arranged and mounted adjacent to opposite sides of the loading assembly, and the at least two sliding members are connected to the two groups of the at least two clamping subassemblies, respectively, the driver is capable of driving the at least two sliding members to move away from or toward each other to enable the two groups of the clamping subassemblies to move toward or away from the loading assembly to clamp or release a workpiece on the loading assembly.

2. The positioning mechanism of claim 1, further comprising a first driving assembly, a transmission member, and a second driving assembly, wherein the transmission member engages with the first driving assembly and is capable of sliding along a first direction, the second driving assembly engages with the transmission member and is capable of sliding along a second direction perpendicular to the first direction, the loading assembly is mounted on the second driving assembly.

3. The positioning mechanism of claim 2, wherein the first driving assembly comprises a first shell, a first driving member at an end of the first shell, and a first screw leading rod received in the first shell, the first screw leading rod is connected to and driven by the first driving member, the transmission member engages with the first screw leading rod.

4. The positioning mechanism of claim 3, wherein the second driving assembly comprises a second shell, a second driving member at an end of the second shell, and a second screw leading rod received in the second shell, the second shell is arranged perpendicular to the first shell, the second driving member is connected to and drives the second screw leading rod, the second screw leading rod engages with the transmission member.

5. The positioning mechanism of claim 4, wherein the transmission member comprises a base seat, a first screw portion, and a second screw portion, the first screw portion and the second screw portion are arranged at opposite sides of the base seat, the base seat is movably mounted on the first shell, the first screw portion engages with the first screw leading rod and slides along a longitudinal direction of the first shell, the second screw leading rod engages with the second screw portion, and the second driving assembly is capable of sliding along a longitudinal direction of the second shell.

6. The positioning mechanism of claim 4, further comprising a receiving barrel made of flexible materials, wherein the receiving barrel is parallel to the first shell, and defines a receiving passage along a longitudinal direction thereof, an end of the receiving barrel is located adjacent to the first driving member, an opposite end of the receiving barrel is fixed to the second shell.

7. The positioning mechanism of claim 1, wherein the loading assembly comprises a loading member and a positioning member, the loading member comprises a fixing portion and a loading portion at an end of the fixing portion, the positioning member is mounted on the loading portion and defines a positioning groove thereon for receiving a workpiece, the two groups of the at least two clamping subassemblies are mounted on opposite sides of the loading portion adjacent a periphery of the positioning member.

8. The positioning mechanism of claim 7, wherein each clamping subassembly comprises a base rod mounted on the loading member, a clamping rod parallel to the base rod, a linking rod, and a pressing rod, the clamping rod protrudes toward the positioning groove and forms a resisting end thereof above the positioning groove, the linking rod rotatably interconnects the ends of the base rod and the clamping rod away from the positioning member, a first end of the pressing rod is connected to a middle portion of the clamping rod, and a second end of the pressing rod opposite to the first end extends through the loading member and is connected to one sliding member.

9. The positioning mechanism of claim 8, wherein a width of the loading portion is larger than a width of the positioning member, the loading portion of the loading member defines a plurality of extending grooves at opposite sides thereof adjacent to the periphery of the positioning member, the pressing rod extends through the corresponding one extending groove of the loading member, and a middle portion of the pressing rod is rotatably connected to an end of the base rod away from the linking rod.

10. The positioning mechanism of claim 8, wherein the driver comprises a guiding portion at a bottom thereof, the sliding member is substantially C shaped and comprises a sliding portion at a bottom thereof, the sliding portion slidably engages with the guiding portion, two ends of the sliding member are connected to one group of the clamping subassemblies, respectively.

11. A bonding device for bonding two or more workpieces, comprising:
   a platform;
   a first bonding mechanism mounted on the platform; and a positioning mechanism mounted on the platform, the positioning mechanism comprising:
a loading assembly, and
a clamping assembly comprising:
a driver mounted on a bottom of the loading assembly;
at least two sliding members driven by the driver; and
at least two clamping subassemblies mounted on a top of the loading assembly, wherein the at least two clamping subassemblies are divided into two groups, the two groups of the at least two clamping subassemblies are arranged and mounted adjacent to opposite sides of the loading assembly, and the at least two sliding members are connected to the two groups of the clamping subassemblies, respectively, the driver is capable of driving the at least two sliding members to move away from or toward each other to enable the two groups of the clamping subassemblies to move toward or away from the loading assembly to clamp or release a first workpiece on the loading assembly, such that the first bonding mechanism is capable of bonding the second workpiece to the first workpiece cooperatively.

12. The bonding device of claim 11, wherein the positioning mechanism further comprises a first driving assembly, a transmission member, and a second driving assembly, the transmission member engages with the first driving assembly and is capable of sliding along a first direction, the second driving assembly engages with the transmission member and is capable of sliding along a second direction perpendicular to the first direction, the loading assembly is mounted on the second driving assembly.

13. The bonding device of claim 12, wherein the first driving assembly comprises a first shell, a first driving member at an end of the first shell, and a first screw leading rod received in the first shell, the first screw leading rod is connected to and driven by the first driving member, the transmission member engages with the first screw leading rod.

14. The bonding device of claim 13, wherein the second driving assembly comprises a second shell, a second driving member at an end of the second shell, and a second screw leading rod received in the second shell, the second shell is arranged perpendicular to the first shell, the second driving member is connected to and drives the second screw leading rod, the transmission member comprises a base seat, a first screw portion and a second screw portion, the first screw portion and the second screw portion are arranged at opposite sides of the base seat, the base seat is movably mounted on the first shell, the first screw portion engages with the first screw leading rod and slides along a longitudinal direction of the first shell, the second screw leading rod engages with the second screw portion of the transmission member, and the second driving assembly is capable of sliding along a longitudinal direction of the second shell.

15. The bonding device of claim 14, wherein the positioning mechanism further comprises a receiving barrel made of flexible materials, the receiving barrel is arranged parallel to the first shell, and defines a receiving passage along a longitudinal direction thereof, an end of the receiving barrel is mounted on the platform adjacent to the first driving member, an opposite end of the receiving barrel is fixed to the second shell.

16. The bonding device of claim 11, wherein the loading assembly comprises a loading member and a positioning member, the loading member comprises a fixing portion and a loading portion at an end of the fixing portion, the positioning member is mounted on the loading portion and defines a positioning groove thereon for receiving the first workpiece, the two groups of the at least two clamping subassemblies are mounted on opposite sides of the loading portion adjacent a periphery of the positioning member.

17. The bonding device of claim 16, wherein the positioning member defines a positioning cutout at an edge of a bottom of the positioning groove, the loading portion of loading member defines a cutout at an end away from the fixing portion corresponding to the positioning cutout, the cutout and the positioning cutout cooperatively allowing the second workpiece passing therethrough.

18. The bonding device of claim 16, wherein each clamping subassembly comprises a base rod mounted on the loading member, a clamping rod parallel to the base rod, a linking rod, and a pressing rod, the clamping rod protrudes toward the positioning groove and forms a resisting end above the positioning groove, the linking rod rotatably interconnects the ends of the base rod and the clamping rod away from the positioning member, a first end of the pressing rod is connected to a middle portion of the clamping rod, and a second end of the pressing rod opposite to the first end extends through the loading member and is connected to one sliding member.

19. The bonding device of claim 18, wherein a width of the loading portion is larger than that of the positioning member, the loading portion defines a plurality of extending grooves at opposite sides thereof adjacent to the periphery of the positioning member, the pressing rod extends through corresponding one extending groove, and a middle portion of the pressing rod is rotatably connected to an end of the base rod away from the linking rod.

20. The bonding device of claim 18, wherein the driver comprises a guiding portion at a bottom thereof, the sliding member is substantially C shaped and comprises a sliding portion at a bottom of the sliding member, the sliding portion slidably engages with the guiding portion, two ends of the sliding member are connected to one group of the clamping subassemblies, respectively.

* * * * *